Patented Nov. 6, 1951

2,574,265

UNITED STATES PATENT OFFICE 2,574,265

SEPARATION OF ORGANOSILICON MATERIALS

James Franklin Hyde, Corning, N. Y., assignor to Corning Glass Works, Corning, N. Y., a corporation of New York No Drawing. Application November 15, 1945, Serial No. 628,965

11 Claims. (Cl. 260—448.2)

The present invention relates to the art of organosilicon compounds with particular reference to the separation or purification of materials of this type. The organosilicon compounds to which reference is made here are those which contain at least one organo group attached to the silicon through a carbon-silicon linkage.

The methods by which compounds of this stated type are produced normally yield mixtures of various organosilicon compounds or unit structures. The production of particular desirable products from such mixtures entails the resolution of the mixtures into fractions concentrated with respect to the various organosilicon units which are present.

In the art and as practiced commercially, this separation is made by distilling a crude mixture of organo chlor silanes or organo ethoxy silanes. While satisfactory results are obtainable thereby, the boiling points of the materials to be separated are frequently very close together, and it, therefore, often requires very close fractionation to obtain good separation.

While the separation of materials such as mixed organo chlor silanes may be effected by fractionation, the separation of copolymeric siloxanes produced by hydrolyzing such mixtures has heretofore not been described in the literature.

Objects of the present invention are the separation of mixtures containing various organosilicon units into fractions concentrated with respect to particular units or the purification by separation of materials containing predominantly one type of organosilicon unit from others constituting impurities, in which the separation is effected on the basis of differing chemical characteristics of the various units. Other objects and advantages of this invention will be apparent from the following description.

In accordance with a preferred form of the present invention, a material containing various organosilicon units is reacted with an alkali metal hydroxide. Organosilicon salts are thereby formed of some of the organosilicon materials present. The salts so formed are then separated from the other organosilicon materials present. By this procedure, separation is effected between compounds in which differing substituents are attached to the silicon atoms, other than the organo groups.

The organosilicon materials to which this invention relates are those which contain organosilicon units having one, two or three organo radicals attached to the silicon through a carbon-silicon linkage. The organo radicals within the purview of this invention are the monovalent hydrocarbon radicals, particularly alkyl, aryl, alkaryl, aralkyl and alicyclic radicals, such as methyl, phenyl, tolyl, benzyl and cyclohexyl, respectively. The alkyl silicon compounds are of particular importance herein. The alkyl radicals may be of considerable diversity in carbon aggregation, such as methyl and octadecyl. However, it is preferred that the alkyls contain less than six carbon atoms per radical as, for example, methyl, ethyl, propyl, butyl, isobutyl, amyl, and isoamyl. The preferred organosilicon materials to which this invention relates are those containing alkyl or aryl radicals or both, whether linked to the same or to different silicon atoms.

The separation procedure of this invention is applicable to organosilicon materials in hydrolyzed state. Such hydrolysis products may be more or less polymerized, with accompanying dehydration, to mixed siloxanes. It has been found that the alkali will react selectively with one of the materials present forming a salt thereof. This salt formation results, with copolymers, in the removal of the organosilicon units of which the salt is formed from the copolymer molecules. The remaining material is generally a polymer, the specific properties of which will vary with the conditions. In accordance herewith, this mixture of polymer and salt is separated. In case the polymer is of high viscosity, the polymer may either be broken down, as by the addition of an alcohol in the presence of the caustic, or it may be dissolved in a solvent.

When it is desired to separate mixtures of monomeric organosilicon materials, such as those in which the remaining valences of the silicon are linked to one or more of the substituents of the group hydrogen, chlorine, alkoxy, aroxy and amino, the mixture preferably is hydrolyzed and reacted with the alkali metal hydroxide. The hydroysis and reaction with the hydroxide may be carried out either as two separate procedural steps or may be conduced as a single step. Alternatively, the mixture may be reacted with a substantially anhydrous alkali metal hydroxide, whereby only partial hydrolysis occurs and a large proportion of one or more of the original components of the mixture is recovered in its original but purified form.

Accordingly, the hydrolysis products to which the process of the present invention may be applied may be produced by hydrolyzing mixtures of materials which contain organosilicon units of the type $$R_n—Si—Y_{4-n}$$

wherein $n$ is an integer from 1 to 3, each R is a monovalent hydrocarbon radical, and each Y is a group selected from the class consisting of hydrogen, halogen, alkoxy, aroxy, and amino.

Mixtures of the above types of compounds may be obtained in various ways, but are commonly and commercially obtained by the Grignard 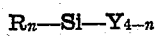 reaction between a silicon tetrahalide or an organosilicon halide and an organo magnesium halide in accordance with the following typical reactions:

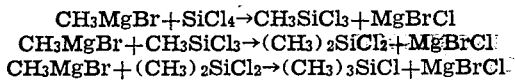

Inasmuch as the indicated reactions proceed simultaneously, the reaction product normally contains a mixture of organosilicon halides of the types indicated, even when stoichiometric amounts of reactants are employed for a particular one of the derivatives. The reaction product likewise frequently contains unreacted silicon tetrachloride and sometimes also tetra-organo silanes. Equivalent mixtures of alkoxy derivatives are also obtainable. Mixtures are also obtained by other types of production methods.

This invention is further applicable in instances where the material to be separated contains organosilicon components having various organo groups. Thus, in the production of a material such as methyl phenyl siloxane, a purified methyl trichlor silane may be reacted with a phenyl Grignard reagent. The crude product normally contains some unreacted methyl trichlor silane, a predominant amount of methyl phenyl dichlor silane and some methyl diphenyl chlor silane. Mixtures of this character may be separated by the process of this invention. Another type of mixture which may be separated in accordance herewith contains organosilicon units carrying the same number of differing organo radicals, for example, 1,1,1-trimethyl-2,2,2-triphenyl disiloxane, there being obtained a separation between the trimethyl silicon units and the triphenyl silicon units. The separation of such units by the process of this invention is probably due to the reactivity of the units with the alkali metal hydroxide being a function of the particular organo radicals contained in the units as well as the number thereof.

The mixture to be separated is reacted with caustic alkali at a temperature below that at which the carbon-silicon linkages are broken. The caustic alkali employed is preferably sodium hydroxide, due to the low cost of this material, though alternatively the hydroxides of lithium, potassium, rubidium and cesium may be employed. It has been found that alkali metal hydroxide, in the presence of a material containing various organosilicon units, reacts selectively to form alkali metal salts of some of the units, depending upon the organo substituents, whereby separation between the salts of those materials selectively reacting and the other materials may be obtained, based on the wide discrepancy in physical properties between the salts and the materials not reacting with the alkali.

When organosilicon compounds are mixed with an alkali metal hydroxide, the latter reacts with at least a portion of the derivatives present, with the formation of salts of some or all of them, depending upon the constituents of the mixture and the amount of alkali employed. When the derivatives are of the above indicated group of hydrolyzable compounds, and when water is present, hydrolysis of the derivatives also occurs. Alkali should be employed in amount sufficient for the formation of organosilicon salt from at least some of the derivatives present, and, in the case of hydrolysis, for the neutralization of any inorganic acid produced. Salts of the other materials either may not be formed, or if formed may then be selectively hydrolyzed. It is believed probable that frequently salts of these other organosilicon derivatives are formed as intermediates, which salts react with the more reactive organosilicon derivatives. This would result in the formation of the salt of the more reactive derivatives and the freeing of the hydrolyzate of the less reactive derivatives.

The process of this invention, as applied to the separation of siloxanes, does not depend upon thermal decomposition of the polymers and is operated at below the temperature at which thermal depolymerization occurs. It is preferred to operate at temperatures below about 100° C. when monoorgano silicon derivatives are present, inasmuch as higher temperatures are conducive to gelation, which makes difficult the subsequent separation of the organosilicon salts which are present. When the mixture is substantially free of monoorgano silicon derivatives, higher temperatures as below 150° C. may be employed.

Considerable latitude is possible in the amount of alkali employed in order to obtain reaction with and salt formation from the most reactive of the organosilicon compounds present. It is a general characteristic of the organosilicon compounds that the lower the number of organo groups present, the greater is the reactivity with alkali. Accordingly, when the material to be separated contains units carrying differing numbers of organo groups, a salt will preferentially be formed of the units carrying the lowest number of groups. In a mixture of mono- and diorganosilicon compounds, the mono-components will form an alkali metal salt by reaction with the caustic alkali. When the caustic alkali present is equivalent to the mono-components, substantially complete separation of the mono-components from higher substituted material may be obtained. Partial removal of the mono-substituted constituents is possible by employing a fractional mol. equivalent.

Salts of the type $C_6H_5SiOONa$ have been referred to in the literature. Such a salt contains equivalent amounts of sodium and silicon. I have found that the monoorgano silicon compounds also form salts containing higher proportions of sodium, as, for example, $[CH_3Si(ONa)_2]_2O$ and $CH_3Si(ONa)_3$. The salts of the monoorgano silicon compounds are quite stable in aqueous solution, even with considerable dilution. If sufficient alkali is employed to form salts of the diorgano components present in addition to the monoorgano components, the diorgano salts may be hydrolyzed by dilution with water to the corresponding diorgano silane diols or siloxanes. It is preferred in the separation of monoorgano silicon derivatives from mixtures which contain a lower mol. per cent of monoorgano derivatives than polyorgano derivatives that the alkali be present in amount not greater than one equivalent per equivalent of mono- and poly-derivatives. The most complete separation is effected when the amount of alkali is between one and two equivalents per equivalent of monoorgano silicon derivative present. This range is preferred both when the mol. per cent of monoorgano derivatives is either more or less than the mol. per cent of the polyorgano derivatives.

Likewise, in the separation of triorgano silicon derivatives from di-, or mono- and diorgano silicon derivatives, it is preferred that the amount of alkali be between one and two equivalents per equivalent of mono- and di-derivatives, though when the mol. per cent of the tri-derivative is greater than sum of the mono- and di-derivatives, the alkali may be employed in amount up to one equivalent per equivalent of mono-, di- and tri-derivatives.

The reaction of organosilicon compounds containing such readily hydrolyzable groups as chlorides and alkoxy groups with caustic alkali is readily obtainable at rates sufficiently rapid for commercial practice when any water present is in amount less than 3.33 mols, per mol. of alkali metal hydroxide. In the case of hydrolyzates which have been totally or partially dehydrated, many of which are highly viscous or solid, it is frequently desirable to add a mutual solvent for the hydrolyzate and the caustic alkali in order to obtain a rapid break down of the polymer. The most common mutual solvents are the lower aliphatic alcohols, such as methyl, ethyl and isopropyl alcohols.

Various methods may be employed for the separation of the organosilicon salts and the other organosilicon materials in the form of hydrolysis products. As has above been indicated, the salts of mono- and diorgano silicon materials have characteristically different stability in aqueous solution. Accordingly, the monoorgano silicon salt may crystallize when a sufficiently small amount of water is employed. By dilution with water the monosalt may be obtained in aqueous solution, and any di- or triorgano silicon material oiled out in a separate phase. The phase containing the monoorgano silicon material, thus, may be either a solid or liquid phase, which may be separated by filtration or decantation, respectively. It is frequently desirable to add a solvent for the hydroyzed material, existing as silanol or siloxane, in which solvent the monoorgano silicon salt is relatively insoluble. Ether is generally satisfactory for this purpose. When the monorgano silicon salt is separated as a solid phase from polyorgano silicon hydroyzates, it is preferred that the alkali metal hydroxide be employed in amount about equivalent to the monoorgano silicon constituents.

In the separation of diorgano from triorgano silicon compounds, separation of the phase containing the triorgano material may be effected by vaporization of the volatile ether. Alternatively the triorgano silanol or silicyl ether may be removed by filtration or decantation as an oil phase, preferably using a solvent to take up this triorgano material. The diorgano material is in this case a solid or concentrated aqueous phase. The di-organo silicon salts are reasonably stable in aqueous solutions in which the amount of water does not exceed 3.33 mols, per mol of alkali employed. The inclusion of a lower aliphatic alcohol, such as ethyl alcohol, in the aqueous solution of the diorgano material is advantageous in this instance, since it has the general effect of preventing oiling out of the diorgano silicon salt. When an alcohol is employed as a mutual solvent in depolymerization, it is preferably eliminated when it is desired to obtain oiling out of diorgano material by hydroysis.

When solid salt is to be separated, the reaction mixture may either be substantially anhydrous or contain water, since the salts here involved quite generally crystallize with water of crystallization.

When starting with a mixture of mono, di- and triorgano silicon compounds, two general modes of operation may be employed. It is preferred, first, to separate the monoorgano from the di- and triorgano material, in which case the methods above indicated for the separation of monoorgano from diorgano silicon units may be employed. The remaining unreacted mixture of di- and triorgano material may then be treated as indicated. Alternatively, the triorgano material may be separated from the mono- and di-substituted material, in which case the caustic alkali is preferably employed in an amount between about one and two atoms of sodium per atom of silicon combined in the form of mono- and di-substituted units. The amount of water, if present, is sufficiently restricted that there are not over 3.33 mols. of water present per mol. of caustic alkali employed, in order to hold the di-substituted material in solution as salt. The tri-substituted material may be separated by filtration, decantation, or distillation. Separation of the mono- and di-substituted salts may then be obtained by dilution of the solution with water, causing the di-substituted material to be oiled out, together with any residual tri-substituted material.

The alkali metal salts of the organosilicon compounds produced during the operation of the processes herein described may either be recovered as salts or they may be treated to recover the respective organo silanol or the condensed polymer thereof. Thus, the methyl trisodoxy silane crystallizes with 7.5 mols. of water per mol. of salt. The hydrated salt may then be employed directly or it may be dehydrated by reduction of the water vapor pressure thereon followed by heating to the substantially anhydrous state. Likewise an acid may be added to the salts resulting in the production of a siloxane. Alternatively, the salt may be added to an acid in excess, preferably in the presence of a solvent for the product to act as a collecting fluid, resulting in production of a silanol or silane diol.

For a better understanding of this invention reference may be had to the following examples, which, however, should be considered only as illustrative hereof.

*Example 1*

A mixture containing 178 parts by weight of methyl triethoxy silane, 148 parts of dimethyl diethoxy silane and 149.5 parts of trimethyl ethoxy silane was hydrolyzed by adding 54 parts of water gradually over a period of 2 to 3 hours, there being added 0.1 part of concentrated hydrochloric acid to accelerate the hydrolysis. The reaction mixture was warmed to 50 to 60° C. and held for several hours. 3 parts more of water was added and the alcohol produced in the hydrolysis was distilled out at 130° C. whereby there were obtained 218.7 parts of hydrolysis product. From the alcoholic distillate there were recovered by dilution with water 13.4 parts of hexamethyl disiloxane. The hydrolysis product contained some silicol and some ethoxy groups. By a weight balance it contained 68 parts monomethyl, 74 parts of dimethyl and 67 parts of trimethyl materials.

Fifty parts by weight of this siloxane copolymer were treated with 26.8 parts of flake caustic soda and 5 parts of water. The mixture was warmed to 70–80° C. for a half hour and then cooled. A semi-crystalline mass was formed which was placed under a vacuum of 20 to 30 mm. mercury pressure. Air was bled into the reaction mixture and the temperature finally raised to 212° F. The exhaust from the reaction mixture was led through a Dry-Ice trap. A yield of 11.75 parts of predominantly trisubstituted material was obtained in the trap. There remained 63.55 parts of reaction mixture as a solid powdery residue to which there were added gradually 60 parts of water with cooling and stirring. After warming, the mixture was allowed to stand some hours, whereupon oil and aqueous phases separated. The two phases were decanted, and the aqueous phase extracted with ether. From the oily phase and the ether extract, there was obtained a yield of 16.78 parts of oil, predominantly dimethyl siloxane. The monomethyl material was recovered from the salt solution by adding it to hydrochloric acid in excess, using benzene to collect the monomethyl silicic acid as it was freed from the salt, there being a yield of 16 parts. In this example there was employed one atomic equivalent of sodium as caustic alkali per atomic equivalent of silicon. The amount of water present during the separation of triorgano components was between 0.74 and 0.95 mol. of water per mol. of alkali employed. The water added to oil out the diorgano material reduced the concentration to 5 mols. of water per mol. of alkali

*Example 2*

25 parts by weight of the polymer employed in Example 1 were treated with 9.64 parts of flake sodium hydroxide, the mixture being warmed and agitated at 70 to 80° C. On cooling, the reaction mixture, which was almost solid, was mixed with one part of water and then reheated for 15 to 20 minutes at 80° C. with agitation. The trisubstituted component was obtained by vacuum distillation as in Example 1, giving a yield of 3.3 parts of hexamethyl disiloxane. To the residue from vacuum distillation, there were added five parts of diethyl ether and 30 parts of water with agitation and cooling. There was thereby formed an emulsion which separated readily upon further dilution with water. The oil layer yielded 12 parts of principally dimethyl siloxane. Recovery of the mono-substituted salt from the aqueous solution yielded 7.6 parts of concentrated monomethyl siloxane. In this example, there was employed one atomic equivalent of sodium as caustic per atomic equivalent of silicon present as mono- and diorgano silicon components. During separation of the triorgano silicon material, the reaction mixture contained 0.23 mol. of water per atom of sodium, which was increased to 6.98 mols. of water per atom of sodium during separation of the diorgano silicon material.

*Example 3*

25 parts by weight of the polymer employed in Example 1 were mixed with 4.84 parts of solid caustic soda and 2.2 parts of water, equivalent to one mol. of water per atom of sodium. There was present one atomic equivalent of sodium as caustic per atomic equivalent of silicon present as monoorgano silicon materials. The mixture was warmed and shaken for 5-10 minutes. The reaction mixture was extracted with 14 to 21 parts of diethyl ether. Evaporation of the extract gave 17.17 parts of a quite fluid oil constituting the di- and triorgano silicon components of the charge. The residue was 12.3 parts of a salt, which was indicated by analysis to be a monomethyl silicon salt.

*Example 4*

12.53 parts by weight of the copolymer described in Example 1 were mixed with 2.56 parts of caustic soda in 2.49 parts of water (2.22 mols. water per atom of sodium), the caustic soda being equivalent to the mono-substituted material present. The reaction mixture was shaken for 35 minutes, after which there was a nearly solid crystalline mush and a clear fluid oil layer. There were then added 0.5 part of water (a total of 2.6 mols. water per atom of sodium), after which the mixture was agitated and allowed to stand for 48 hours. 5 parts of water were then added (a total of 6.50 mols. water per atom of sodium) and the oil and water layers were separated by decantation. The separation and washing of the aqueous phase with ether gave 9.17 parts (theoretical yield=8.46 parts) of di- and trisubstituted oil. The mono substituted material was recovered from the alkaline solution by neutralization with hydrochloric acid and yielded 3.25 parts of oil (theoretical yield=4.07 parts). The mixture of di- and trisubstituted material may be subjected to retreatment in accordance with the process disclosed herein.

*Example 5*

A siloxane oil having a viscosity of 58 centistokes was subjected to separation. The oil was prepared by hydrolyzing 10 mol. per cent of monomethyl trichlor silane and 90 mol. per cent dimethyl dichlor silane, whereby the siloxane oil was produced. 73.3 parts by weight of the oil were treated with a solution of 4 parts of caustic soda in 3.87 parts of water (2.1 mols. water per atom of sodium). There was employed one mol. of caustic soda per atom of monomethyl substituted silicon. The reaction mixture was warmed to 70 to 80° C. and shaken for 20 minutes and then allowed to stand for some hours. The solid which was suspended in the oil was filtered out and washed with ether to remove occluded oil. 14.95 parts of powdery crystalline material remained. The filtrate, together with oil recovered in the ether washing amounted to 64.84 parts. By the treatment removing the monomethyl silicon constituents, the viscosity of the oil was increased to 81 centistokes.

*Example 6*

20 parts by weight of a siloxane of substantially the constitution

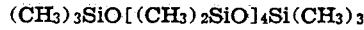

was subjected to separation by treating with 6.97 parts of solid caustic soda (1 mol. of caustic soda per atom of dimethyl substituted silicon). 1.85 parts of water were added with the mixture at approximately 212° F. No reaction occurred. 5 parts of ethyl alcohol were gradually added to facilitate mixing of the oil and aqueous phases. The mixture was refluxed for two hours, resulting in the disappearance of the alkali and the production of a uniform semi-crystalline mass. The reaction mixture was then distilled whereby there were obtained 4.86 parts of hexamethyl disiloxane and 4.70 parts of alcohol and water. Complete removal of trimethyl silicon components would yield 7.1 parts of the disiloxane. The removal of 68.4 per cent of the trimethyl silicon components will allow a greater average molecular aggregation in the siloxane. The residue obtained was 21.9 parts by weight and appeared to be primarily the salt NaO[(CH₃)₂SiO]₂Na plus a portion of the water originally added.

*Example 7*

A siloxane copolymer was separated, which copolymer contained equivalent amounts of diphenyl methyl silicon units and diphenyl silicon units, and which had been prepared by the cohydrolysis of the respective silanes. Then parts of the siloxane were reacted with 2.01 parts of caustic soda (1 mol. per atom of diphenyl substituted silicon) dissolved in 1.95 parts of water (2.16 mols. per mol. of caustic soda). 2.1 parts of petroleum ether were added and the reaction mixture allowed to stand 18 hours. There were then added 5.55 parts of methanol and 5.7 parts of petroleum ether, followed by the gradual addition of 0.5 part of water. At this time there were two liquid phases which were separated. One part of water was added to the aqueous phase which was repeatedly extracted with petroleum ether. The first petroleum ether layer was alkaline and was washed neutral with water. The petroleum ether extracts were evaporated leaving 4.39 parts of $$[C_6H_5)_2CH_3Si]_2O$$

(theoretical yield=5.08 parts). The aqueous solution on evaporation gave 6.18 parts of a slightly ticky solid, principally a hydrated salt of the diphenyl silicon components. (Theoretical yield=5.68 parts anhydrous.) Upon dehydration the neutralization equivalent was 229, exactly equal to that calculated for $$NaO[(C_6H_5)_2SiO]_2Na$$

*Example 8*

An oil containing principally $$HO(C_6H_5.CH_3SiO)_3H$$

together with contaminating material having three organo substituents per silicon atom, was subjected to separation. A sample of the starting material when bodied by heating in the presence of 1 atom of sodium, as caustic soda, per 150 atoms of silicon, went to a maximum viscosity of 14,500 centistokes. The original oil was converted to the sodium salt by employing 1 mol. of caustic soda per atom of silicon. The salt was extracted with benzene to remove triorgano silicol or the ether formed by condensation thereof. The salt was filtered and washed with some petroleum ether of 90 to 100° C. boiling point. The salt was then suspended in diethyl ether and poured into an excess of dilute hydrochloric acid. The recovered oil had a viscosity of 730 centistokes. When this oil was bodied by heating in the presence of a catalytic amount of caustic soda, a viscosity of 66,969 centistokes was obtained.

*Example 9*

A liquid copolymer was subjected to separation which copolymer had been produced by hydrolyzing molecular equivalents of ethyl trichlor silane and ethyl phenyl dichlor silane. 7.67 parts by weight of the copolymer were treated with 5.3 parts of caustic soda dissolved in 4 parts of water. After stirring and warming for 5 to 10 minutes an additional 2 parts of caustic soda and 4 parts of water were added to obtain complete breakdown of the copolymer. An additional 14 parts of water was added to reduce the viscosity. The taffy-like resin then became more crystalline in appearance. It was then heated to boiling for 5 to 10 minutes, which resulted in a large part of the mass going into solution, leaving undissolved, an oily fluid. The reaction mixture was extracted three times with ether, using 20 parts of ether per extraction. The ether extracts were evaporated, leaving a viscous oil predominantly phenyl ethyl siloxane. This oil was dissolved in toluene and re-evaporated to eliminate water. Upon heating to 110 to 120° C. in vacuum, 4.85 parts of oil were recovered (theoretical yield=4.98 parts). The aqueous salt solution was neutralized with 20 parts of concentrated hydrochloric acid whereby there was obtained a coagulated sticky mass. This was washed by boiling with water to remove any salt present. Upon drying and heating, there was obtained a yield of 2.38 parts of monoethyl siloxane in the form of a solid (theoretical yield=2.69 parts).

*Example 10*

Mixed monomethyl and dimethyl ethoxy silanes were hydrolyzed and reacted with caustic soda in a single step. The mixed silanes were stirred with a saturated aqueous caustic alkali and the amount of water requisite for hydrolysis then added. The following reaction mixtures, expressed in mols., were prepared:

| $(CH_3)_2Si(OC_2H_5)_2$ | $CH_3Si(OC_2H_5)_3$ | Conc. NaOH | $H_2O$ |
|---|---|---|---|
| 100 | 1 | 1 | 203 |
| 100 | 2 | 1 | 206 |
| 100 | 5 | 1 | 215 |

Finely divided salts crystallized out in each case and were separated from the oil by filtration.

*Example 11*

1,1,1-trimethyl-2,2,2-triphenyl disiloxane was separated into its components as follows:

To 3.49 parts by weight of the disiloxane there were added 29.55 parts of a methyl alcohol solution containing 0.4 part of caustic soda. Upon warming to the melting point of the disiloxane (51° C.) it melted and then went into solution. The mixture was distilled with reflux for four hours, during which time trimethyl silanol, hexamethyl silicyl ether and most of the methyl alcohol distilled off, and needle crystals of hexaphenyl silicyl ether formed in the residue. The crystallized hexaphenyl silicyl ether was separated by filtration. The filtrate was boiled for four hours and another crop of crystallized ether was separated by filtration. The filtrate was boiled down to a white solid which was dissolved in methyl alcohol containing a small amount of water. A third crop of ether crystallized and was separated by filtration. The filtrate was added to a considerable quantity of cold water to completely hydrolyze the sodoxy triphenyl silane, resulting in a voluminous precipitate of triphenyl silanol which appeared to be free of both trimethyl silanol and hexamethyl disiloxane. Of the original charge 2.67 parts was $(C_6H_5)_3SiO_{0.5}$. Of this 2.43 parts were recovered from the sodium salt by condensation to the ether and by hydrolysis to the silanol, representing a 91% yield.

*Example 12*

To separate phenyl silicon trichloride and phenyl methyl silicon dichloride by fractional distillation is difficult due to their close boiling points. To separate the organo silicon units of such a mixture, containing 20 mol. per cent of the former and 80 mol. per cent of the latter, the mixture was hydrolyzed with water. 10 parts by weight of the copolymer were added slowly to 1.16 parts of saturated aqueous caustic soda, giving an Si to Na atomic ratio of 1 based on the phenyl substituted silicon components present and 2.22 mols. of water per mol. of caustic soda. After completing the addition in 15 minutes, stirring was continued for 30 minutes more. Some white solids had now separated. 7 parts of petroleum ether of 90 to 100° C. boiling point was added, and the mixture heated to the boiling point for a short time to remove excess water, as the precipitated salt was sticky. More petroleum ether was added and the solids separated in a powdery form. After filtering and drying at 140° C. over P₂O₅ for 3.5 hours, 2.01 parts of anhydrous salt were obtained (theoretical yield=2.37). The filtrate after washing neutral and evaporating gave 7.71 parts of oil (theoretical yield=8.09) having a viscosity of 2,490 centistokes.

*Example 13*

Technical dimethyl dichlor silane was treated to form dimethyl siloxane relatively free of monomethyl siloxane. This technical material contained sufficient monomethyl trichlor silane that it gelled in 1.5 hours at 60-70° C. upon the addition of one part by weight of caustic soda per 100 parts of oil. A 50% aqueous caustic soda solution and sufficient solid caustic soda to bring the theoretical concentration to 75% was employed. The technical silane derivative was added to sufficient of this reagent to neutralize all the hydrochloric acid formed by hydrolysis and to provide additionally one molecular equivalent of caustic soda per atom of monimethyl substituted silicon. Sufficient ether was added to give a mixture which could be stirred. After stirring for 36 hours, the solids were removed by filtration and the aqueous layer by decantation. The oil layer had a viscosity of 12 centistokes. Under the conditions above stated, this oil did not gel in 5 hours, indicating relative freedom from monomethyl siloxane. The monomethyl constituents were concentrated in the salt which was recovered as mixed siloxane by acidifying.

I claim:

1. The method of purifying dimethyl silicon dichloride containing in minor proportion monomethyl silicon trichloride, which comprises reacting the mixed chlorides with aqueous sodium hydroxide, the water being present in quantity sufficient to hydrolyze the chlorides with the production of hydrogen chloride and the sodium hydroxide being present in quantity to neutralize the hydrogen chloride produced together with between 1 and 2 mols. of sodium hydroxide per mol. of monomethyl silicon trichloride originally present, and separating the salts so formed from the dimethyl silicon hydrolyzate.

2. A salt of the composition

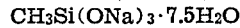

$$CH_3Si(ONa)_3 \cdot 7.5H_2O$$

3. The method of separating hydrolysis products of a mixture of organosilicon compounds of the type $R_nSiY_{(4-n)}$ in which $n$ is an integer from 1 to 3, R is selected from the group consisting of alkyl and monocyclicaryl radicals, and Y is selected from the group consisting of halogen, alkoxy and aroxy, which hydrolysis product contains units in which $n$ has different values, which method comprises reacting said hydrolysis product with an alkali metal hydroxide in amount up to two atoms of alkali metal per atom of silicon contained in units in which $n$ has the lower value, whereby salt of the organosilicon units in which $n$ has the lower value is formed, and separating the salts so formed from the organosilicon units in which $n$ has the higher value.

4. The method of separating hydrolysis products of a mixture of organo silicon compounds of the type $R_nSiY_{(4-n)}$ in which $n$ is an integer from 1 to 3, R is selected from the group consisting of alkyl and monocyclicaryl radicals, and Y is selected from the group consisting of halogen, alkoxy and aroxy, which hydrolysis product contains units in which $n$ has different values, which method comprises reacting said hydrolysis product with an alkali metal hydroxide in amount up to one alkali metal atom per silicon atom, whereby salts of the organosilicon units in which $n$ has the lower value are formed, and separating the salts so formed from the organosilicon units in which $n$ has the higher value.

5. The method of separating mixed mono- and polyorgano silicon hydrolyzates prepared by the hydrolysis of silanes of the type $R_nSiY_{4-n}$ in which Y is selected from the group consisting of halogen, alkoxy and aroxy, $n$ is an integer from 1 to 3, and R is selected from the group consisting of alkyl and monocyclicaryl radicals, which method comprises reacting said hydrolyzate with an alkali metal hydroxide in amount between about one to about two atoms of alkali metal per monoorgano substituted silicon atom, whereby salts of the monoorgano components are formed, and separating the salts so formed as aqueous solution from the polyorgano silicon hydrolyzate, in the presence of at least 3.33 mols of water per mol of alkali metal hydroxide employed.

6. The method of separating mixed mono- and polyorgano silicon hydrolyzates prepared by the hydrolysis of silanes of the type $R_nSiY_{4-n}$ in which Y is selected from the group consisting of halogen, alkoxy and aroxy, $n$ is an integer from 1 to 3 and R is selected from the group consisting of alkyl and monocyclicaryl radicals, which method comprises reacting said hydrolyzate with an alkali metal hydroxide in amount of about one alkali metal atom per atom of silicon, and separating the monoorgano salts so formed as aqueous solution from the polyorgano silicon hydrolyzate, in the presence of at least 3.33 mols of water per mol of alkali metal hydroxide employed.

7. The method of separating di- and triorgano silicon hydrolyzates prepared by the hydrolysis of silanes of the type $R_nSiY_{4-n}$ in which Y is selected from the group halogen, alkoxy aroxy, $n$ is an integer from 2 to 3, and R is selected from the group consisting of alkyl and monocylicaryl radicals, which method comprises reacting said hydrolyzate with an alkali metal hydroxide in amount between about one to about two alkali metal atoms per diorgano substituted silicon atom to form the salt thereof, and separating the diorgano silicon salt from the triorgano silicon hydrolyzate in the presence of less than 3.33 mols of water per mol of alkali metal hydroxide employed, whereby the diorgano silicon components are maintained as salt during the separation.

8. The method of separating mixed mono-, di- and triorganosilicon hydrolyzates prepared by the hydrolysis of silanes of the type $R_nSiY_{4-n}$ in which Y is selected from the group consisting of halogen, alkoxy and aroxy, $n$ is an integer from 1 to 3 and R is selected from the group consisting of alkyl and monocyclic aryl radicals, which comprises reacting the hydrolyzate with an alkali metal hydroxide in quantity sufficient that there is present at least about one atom of alkali metal per mono- and diorgano-silicon atoms, separating alkali metal salts of the mono- and diorganosilicon components thereby produced from the triorganosilicon hydrolyzate components, hydrolyzing the salts of the diorganosilicon components, and separating the aqueous solution of the monoorganosilicon salt from the diorganosilicon hydrolyzate.

9. The method of separating mixed mono-, di- and triorganosilicon hydrolyzates prepared by the hydrolysis of silanes of the type $R_nSiY_{4-n}$ in which Y is selected from the group consisting of halogen, alkoxy and aroxy, $n$ is an integer from 1 to 3 and R is selected from the group consisting of alkyl and monocyclic aryl radicals, which comprises reacting the monoorganosilicon components with an alkali metal hydroxide in amount between 1 and 2 alkali metal atoms per monoorgano substituted silicon atom to form a salt thereof, separating the salt from the di- and triorganosilicon hydrolyzates in the presence of at least 3.33 mols of water per mol of alkali metal hydroxide employed, reacting the mixed di- and triorganosilicon hydrolyzates with between 1 and 2 atoms of alkali metal per silicon atom contained in the diorganosilicon components to form a salt thereof, and separating the diorganosilicon salt from the triorganosilicon hydrolyzate in the presence of less than about 3.33 mols of water per mol of alkali metal hydroxide employed for reacting with the diorganosilicon components, whereby the diorganosilicon components are maintained as salt during separation.

10. The method of separating mixed monomethyl and dimethyl silicon hydrolyzates prepared by the hydrolysis of methyltrichlorosilane and dimethyldichlorosilane, which method comprises reacting said hydroylzate with an alkali metal hydroxide in amount of about one alkali metal atom per atom of silicon whereby an alkali metal salt of methylsilanetriol is formed, and separating the dimethyl silicon hydrolyzate from the alkali metal salt.

11. The method of separating mixed monomethyl and dimethyl silicon hydrolyzates prepared by the hydrolysis of methyltrichlorosilane and dimethyldichlorosilane, which method comprises reacting said hydrolyzates with an alkali-metal hydroxide in the molar ratio of at least 1 mol of alkali-metal hydroxide per mol of monomethyl-substituted silicon whereby an alkali-metal salt of methylsilanetriol is formed, and separating the dimethyl silicon hydrolyzate from the alkali-metal salt.

JAMES FRANKLIN HYDE.

REFERENCES CITED

The following references are of record in the file of this patent:

UNITED STATES PATENTS

| Number | Name | Date |
|---|---|---|
| 2,388,575 | Sauer et al. | Nov. 6, 1945 |
| 2,389,804 | McGregor | Nov. 27, 1945 |

OTHER REFERENCES

Jour. Chem. Soc. (London), vol. 101 (1912) page 2159 (complete article pages 2156–2166), Robinson and Kipping.

Jour. Chem. Soc, (London), vol. 95, pages 310 and 311, Martin and Kipping.

Berichte Deu. Chem., vol. 52, page 723, Stock.

Martin et al.: "Jour. Chem. Society London," vol. 107 (1915) page 1046.

Kipping: "Jour. Chem. Soc. London," vol. 101 (1912), pages 2108–25.

Goodwin: "Jour. Amer. Chem. Soc.," vol. 69 (1947), page 2247.